(12) United States Patent
Radovcic

(10) Patent No.: US 8,782,330 B2
(45) Date of Patent: Jul. 15, 2014

(54) FLASH BOOT AND RECOVERY AREA PROTECTION TO MEET GMR REQUIREMENTS

(75) Inventor: Boris Radovcic, Rockaway, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 206 days.

(21) Appl. No.: 13/465,222

(22) Filed: May 7, 2012

(65) Prior Publication Data

US 2012/0290771 A1    Nov. 15, 2012

Related U.S. Application Data

(60) Provisional application No. 61/484,006, filed on May 9, 2011.

(51) Int. Cl.
*G06F 12/02* (2006.01)
*G06F 12/14* (2006.01)
*G06F 9/46* (2006.01)

(52) U.S. Cl.
CPC ............ *G06F 12/02* (2013.01); *G06F 12/14* (2013.01); *G06F 12/0246* (2013.01); *G06F 9/46* (2013.01); *G06F 2212/7206* (2013.01); *G06F 2212/7209* (2013.01)

USPC .......................................... 711/103

(58) Field of Classification Search
CPC ............ G06F 11/1433; G06F 12/0246; G06F 12/1433; G06F 12/1458; G06F 9/46
See application file for complete search history.

(56) References Cited

U.S. PATENT DOCUMENTS

| 6,331,950 | B1 * | 12/2001 | Kuo et al. ................. 365/185.18 |
| 6,446,179 | B2 * | 9/2002 | Baltar ............................ 711/163 |
| 6,731,536 | B1 * | 5/2004 | McClain et al. .......... 365/185.04 |
| 8,040,725 | B2 * | 10/2011 | Kang ........................ 365/185.03 |
| 2004/0049645 | A1 * | 3/2004 | Lee et al. ...................... 711/163 |
| 2008/0183980 | A1 * | 7/2008 | Lin et al. ....................... 711/154 |

* cited by examiner

*Primary Examiner* — Hiep Nguyen
(74) *Attorney, Agent, or Firm* — Daniel J. Long

(57) ABSTRACT

A system and method for protecting boot and recovery area of a flash memory in order to meet GMR requirements in radio system is disclosed. When the Core Engine Modem is installed in the factory test equipment, LOCK signal on the PoP module is logic high. At this time, the flash will be unlocked, and the boot and recovery code is written. The boot and recovery sectors will then be locked and the user area of the flash is left unlocked. When installed in the GLS DICE-T, LOCK signal on the PoP module is logic low. At this time, the flash device will ignore block lock commands, which prevent the unlocking of the protected sectors. The write enable signal from the GVA can now be utilized to enable writing to the user area of the flash despite of protecting boot and recovery areas.

20 Claims, 9 Drawing Sheets

FLASH BOOT AND RECOVERY AREA PROTECTION TO MEET GMR REQUIREMENTS

CROSS-REFERENCE TO RELATED APPLICATIONS

This Application claims rights under 35 USC §119(e) from U.S. Application Ser. No. 61/484,006 filed May 9, 2011, the contents of which are incorporated herein by reference.

TECHNICAL FIELD

Embodiments are generally related to radio systems. Embodiments are also related to methods for meeting Ground Mobile Radio (GMR) requirements. Embodiments are additionally related to a flash boot and recovery area protection scheme. Embodiments are additionally related to a method for ensuring protection of required areas of flash while keeping the rest accessible.

BACKGROUND OF THE INVENTION

Flash memory is a non-volatile computer storage chip that can be electrically erased and reprogrammed. It was developed from Electrically Erasable Programmable Read-Only Memory (EEPROM) and must be erased in fairly large blocks before these can be rewritten with new data. Flash memories are generally classified into NOR and NAND types. The high density NAND type must also be programmed and read in (smaller) blocks, or pages, while the NOR type allows a single machine word (byte) to be written or read independently. The NAND type is primarily used in memory cards, USB flash drives, solid-state drives, and similar products, for general storage and transfer of data.

Package on Package (PoP) is an integrated circuit packaging technique to allow vertically combining discrete logic and memory Ball Grid Array (BGA) packages. Two or more packages are installed on top of one another, that are stacked, with a standard interface to route signals between them. This allows higher density and smaller physical size for electronic systems such a mobile telephone or personal digital assistant (PDA).

The Package on Package (PoP) module is a multi-chip module comprised of NAND flash and Low Power Dual Data Rate Synchronous Dynamic Access Memory (LPDDR SDRAM). Recently, NAND-flash memories have often been used as read only memories (ROMs) of mobile terminals.

A flash memory in an Integrated Circuit (IC) package such as for example a Package on Package (PoP) module can be utilized in transceivers such as GMR transceiver of a radio system for storing data. Certain requirements for Ground Mobile Radio (GMR) transceiver in radio systems have two areas of flash memory. Such flash memory 100 is depicted in FIG. 1 and has waveform area 102 and boot/recovery area 104. The user area 102 is writable from the outside but the boot/recovery area 104 is write protected.

Referring to FIG. 2, an issue with using the OMAP and the POP Memory Module is that the OMAP on power up has control over the Write Protect signal that goes to the PoP Memory Module Flash Area. These two devices are soldered together and there is no physical way of isolating the Write Protect signal that comes out of the OMAP to the PoP Module. The Write Protect signal is an output out of the OMAP. A need, therefore, exists for a way to employ Flash Boot and Recovery on the GLS Modem which uses the OMAP and PoP Memory Module is the ability of the Crypto Subsystem in the GMR radio to control the Write Protect signal to the PoP Memory Module Flash Area.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a way to employ Flash Boot and Recovery on the GLS Modem which uses the OMAP and PoP Memory Module.

It is another aspect of the disclosed embodiments to provide for methods for meeting Ground Mobile Radio (GMR) requirements.

It is a further aspect of the present invention to provide for a flash boot and recovery area protection scheme.

It is another aspect of the present invention to provide for a system and method for ensuring protection of required areas of flash while keeping the rest accessible.

It is a yet another aspect of the present invention to provide for a system and method for that allows programming and locking boot/recovery area of flash in the factory.

The aforementioned aspects and other objectives and advantages can now be achieved as described herein. The Package on Package (PoP) module on top of OMAP processor which passes some of the signals from the OMAP pins on the circuit card to the PoP pins. The FACTORY_LOCK_N signal is connected from the Core Engine Modem signal connector to the PoP through the OMAP. This signal is also connected to a pull-down resistor. When the Core Engine Modem is installed in the factory test equipment, the FACTORY_LOCK_N signal will be connected to 1.8V which sets the LOCK signal on the PoP module to logic high. In this state, the flash will accept block lock commands which designate the protection of selected flash sectors. At this time, the flash will be unlocked, and the boot and recovery code written. The boot and recovery sectors will then be locked and the user area of the flash is left unlocked.

When the Core Engine Modem is installed in the GLS DICE-T, the FACTORY_LOCK_N signal is not connected to external hardware and is therefore held in the low state by the pull down resistor. The sectors designated previously as locked will now ignore write commands and are therefore protected. Also, since the LOCK pin is low, the flash device will also ignore block lock commands which prevent the unlocking of the protected sectors.

The Universal Transceiver write enable signal from the Ground Vehicle Adapter (GVA) (GVA_WRITE_EN) can now be used to enable writing to the user area of the flash by driving the write protect signal of the PoP (WP#). When GVA_WRITE_EN is low, the user area is write protected and when the signal is driven high by the GVA, the user area is opened for writing. Regardless of the state of WP#, the boot/recovery area remains protected due to the previous locking procedure. The present invention ensures protection of the required areas of flash while keeping the rest accessible. The present invention also allows for programming and locking the boot/recovery area of flash in the factory.

BRIEF DESCRIPTION OF THE DRAWINGS

The accompanying figures, in which like reference numerals refer to identical or functionally-similar elements

DETAILED DESCRIPTION

The particular values and configurations discussed in these non-limiting examples can be varied and are cited merely to illustrate at least one embodiment and are not intended to limit the scope thereof.

Figure 1:
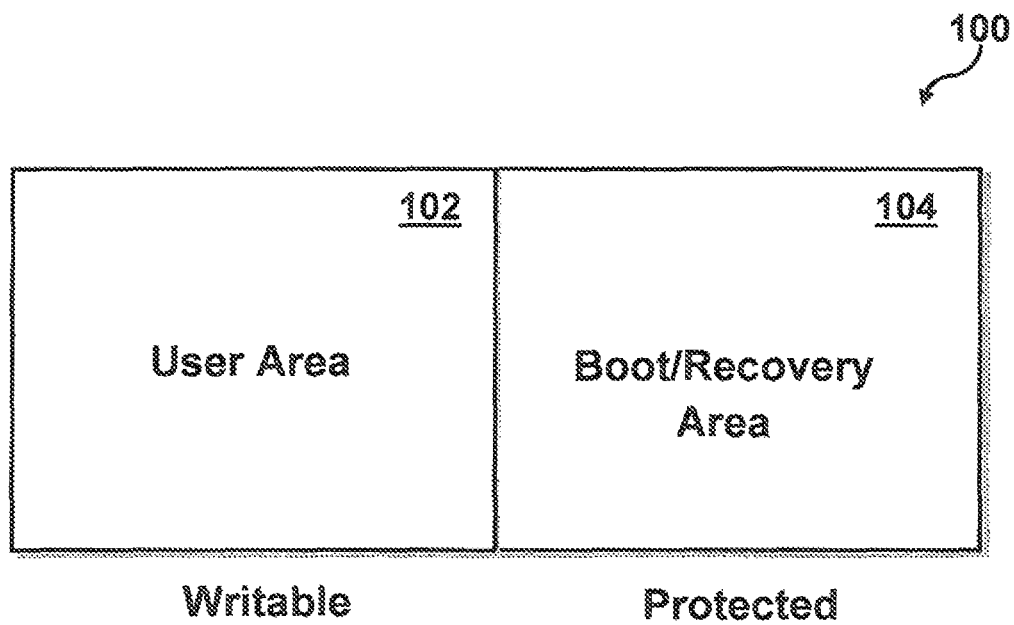
FIG. 1 illustrates a schematic diagram of a conventional flash memory utilized in a radio system.
Figure 2:
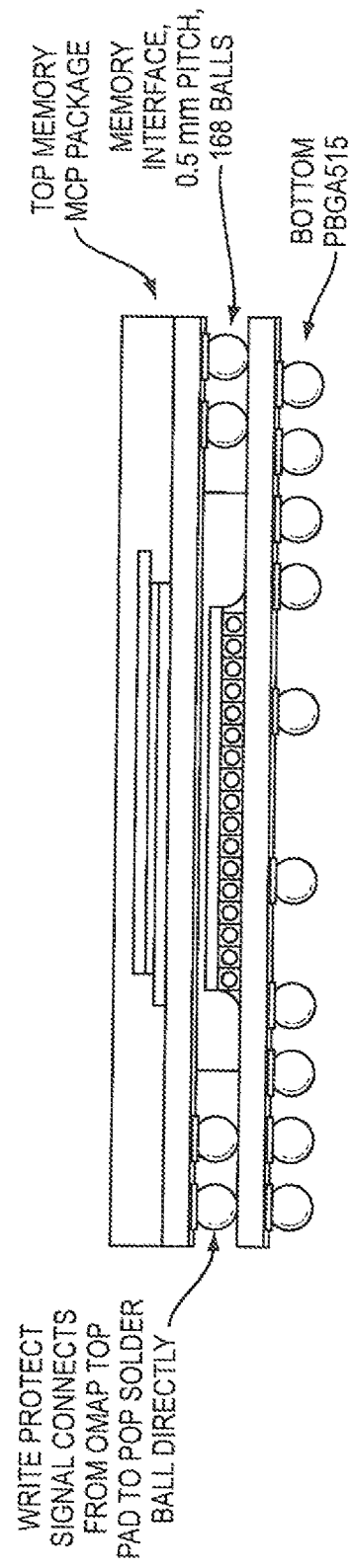
FIG. 2 is a side elevational view of a conventional OMAP and PoP Memory Module.

FIG. 2 illustrates a schematic diagram of a flash memory 200, in accordance with the disclosed embodiments. Initially some sectors of flash memory 200 are designated for writing boot and recovery code, on receiving a LOCK signal 206. Then, the flash memory 200 is unlocked for programming boot and recovery area 204. On writing boot and recover code, the boot and recovery area 204 is left unlocked. Then, on receiving a WR# signal 205, the user area 202 is open for writing and the boot and recovery area 204 remains protected due to previous locking. Note that programming and locking of boot and recovery area 204 can be performed in factory by utilizing factory test equipment. Also, the flash memory 200 may receive write signal from a GVA of radio system.

Figure 3:
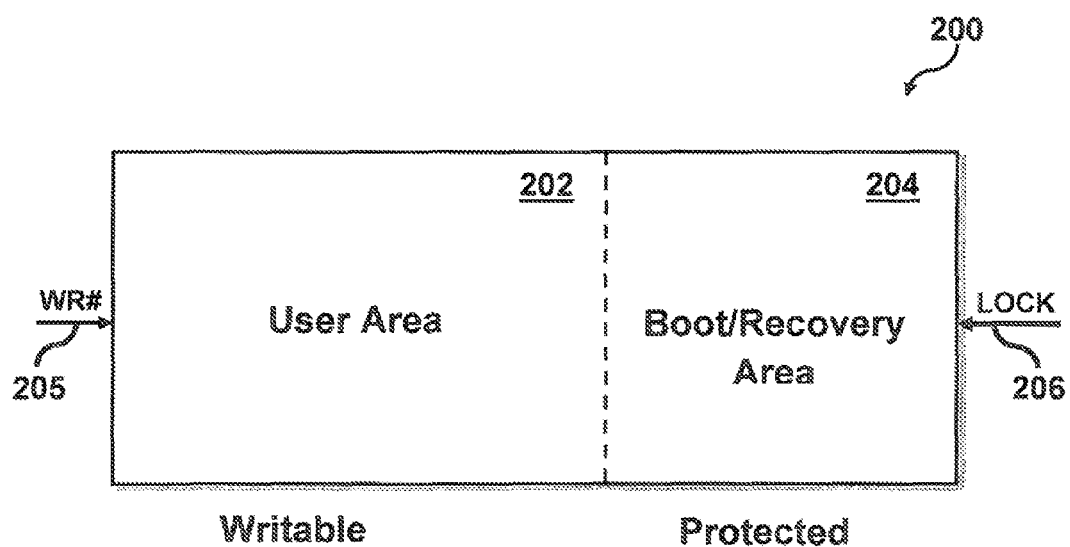
FIG. 3 illustrates a schematic diagram of a flash memory, in accordance with the disclosed embodiments.

FIG. 3 illustrates a schematic diagram of an apparatus 300 utilized for meeting GMR requirements in a radio system, having a core engine modem 312 installed in a factory test equipment 316, in accordance with the disclosed embodiments. The Package on Package (PoP) module 302 is a multi-chip module comprised of the NAND flash memory 200 depicted in FIG. 2 and a Low Power Dual Data Rate Synchronous Dynamic Access Memory (LPDDR SDRAM) 304. The PoP module 302 is placed on a processor for example Open Multimedia Application Protocol (OMAP) 308. The OMAP 308 passes some of the signals from the OMAP pins on the circuit card to the PoP pins.

A FACTORY_LOCK_N signal 315 is connected from a signal connector 314 of Core Engine Modem 312 to the PoP module 302 through the OMAP 308. The FACTORY_LOCK_N signal 315 is also connected to a pull down resistor 210. When the Core Engine Modem 312 is installed in the factory test equipment 316, the FACTORY_LOCK_N signal 315 is connected to 1.8V which sets the LOCK signal 206 on the PoP module 302 to logic high. In this state, the NAND flash memory 200 will accept block lock commands which designate the protection of selected flash sectors. At this time, the flash memory 200 will be unlocked, and the boot and recovery code is written. The boot and recovery sectors will then be locked and the user area of the flash memory 299 is left unlocked.

A schematic diagram of an apparatus 400 utilized for meeting GMR requirements in a radio system, having a core engine modem 312 installed in a GLS DICE-T 402 is depicted. When the Core Engine Modem 312 is installed in the GLS DICE-T 402, the FACTORY_LOCK_N signal 315 is not connected to external hardware and is therefore held in the low state by the pull down resistor 210. The sectors designated previously as locked will now ignore write commands and are therefore protected. Also, since the LOCK signal 206 is low, the NAND flash memory 200 will also ignore block lock commands which prevent the unlocking of the protected sectors.

Figure 5:
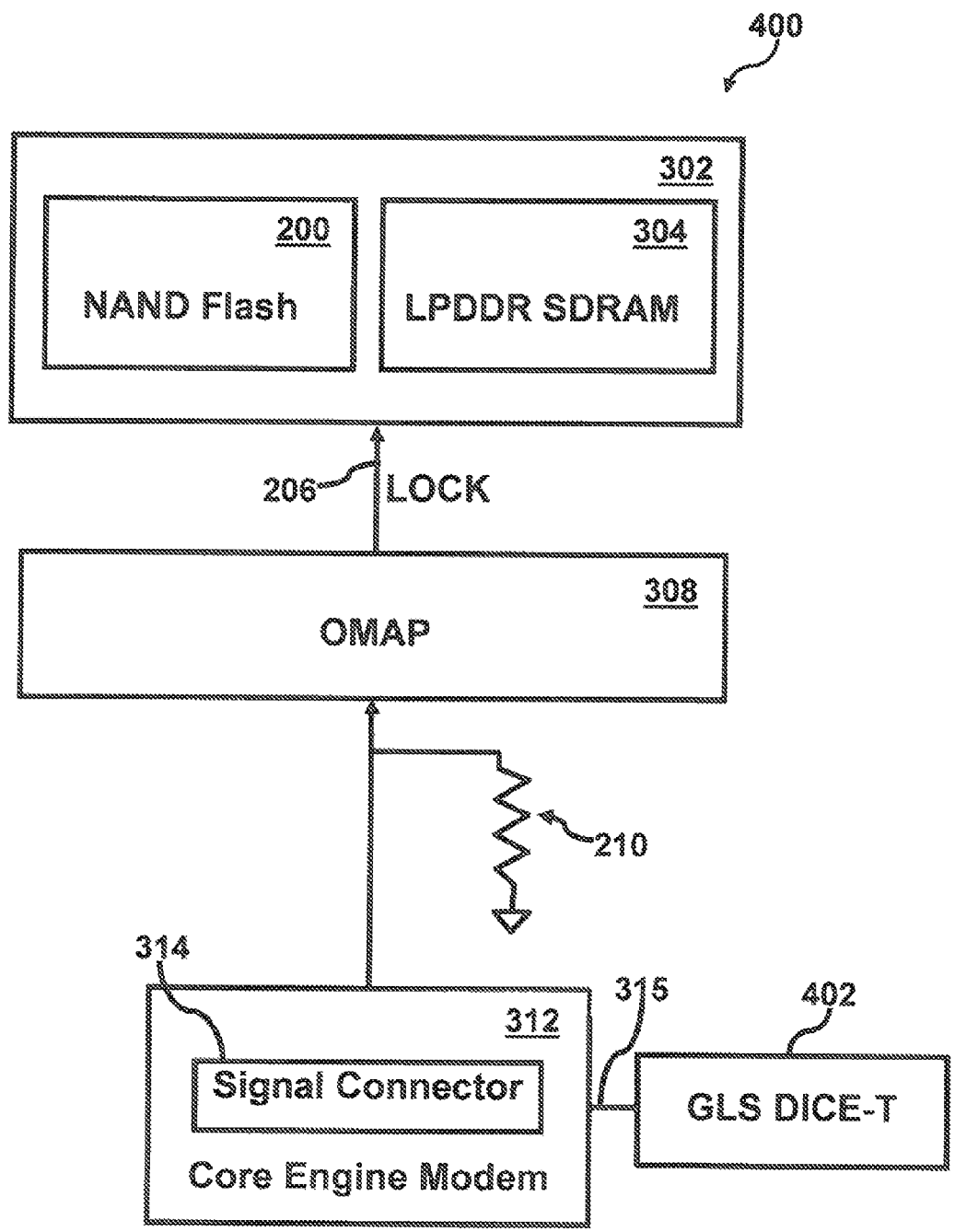
FIG. 5 illustrates a schematic diagram of an apparatus utilized for meeting GMR requirements in a radio system having a core engine modem installed in a GLS DICE-T, in accordance with the disclosed embodiments.

FIG. 5 illustrates a schematic diagram of the flash memory 200 depicted in FIG. 2 showing write and lock signals, in accordance with the disclosed embodiments. A universal transceiver write enable GVA_WRITE_EN signal 340 from a Ground Vehicle Adapter (GVA) (not shown) is utilized to enable writing to the user area 202 of the flash memory 200 by driving the write protect WP# signal 205 of the PoP module 302. When the GVA_WRITE_EN signal 340 is low, the user area 202 is write protected and when the GVA_WRITE_EN signal 340 is driven high by the GVA, the user area 202 is opened for writing. Regardless of the state of the WP# signal 205, the boot/recovery area 204 remains protected due to the previous locking procedure.

Figure 4:
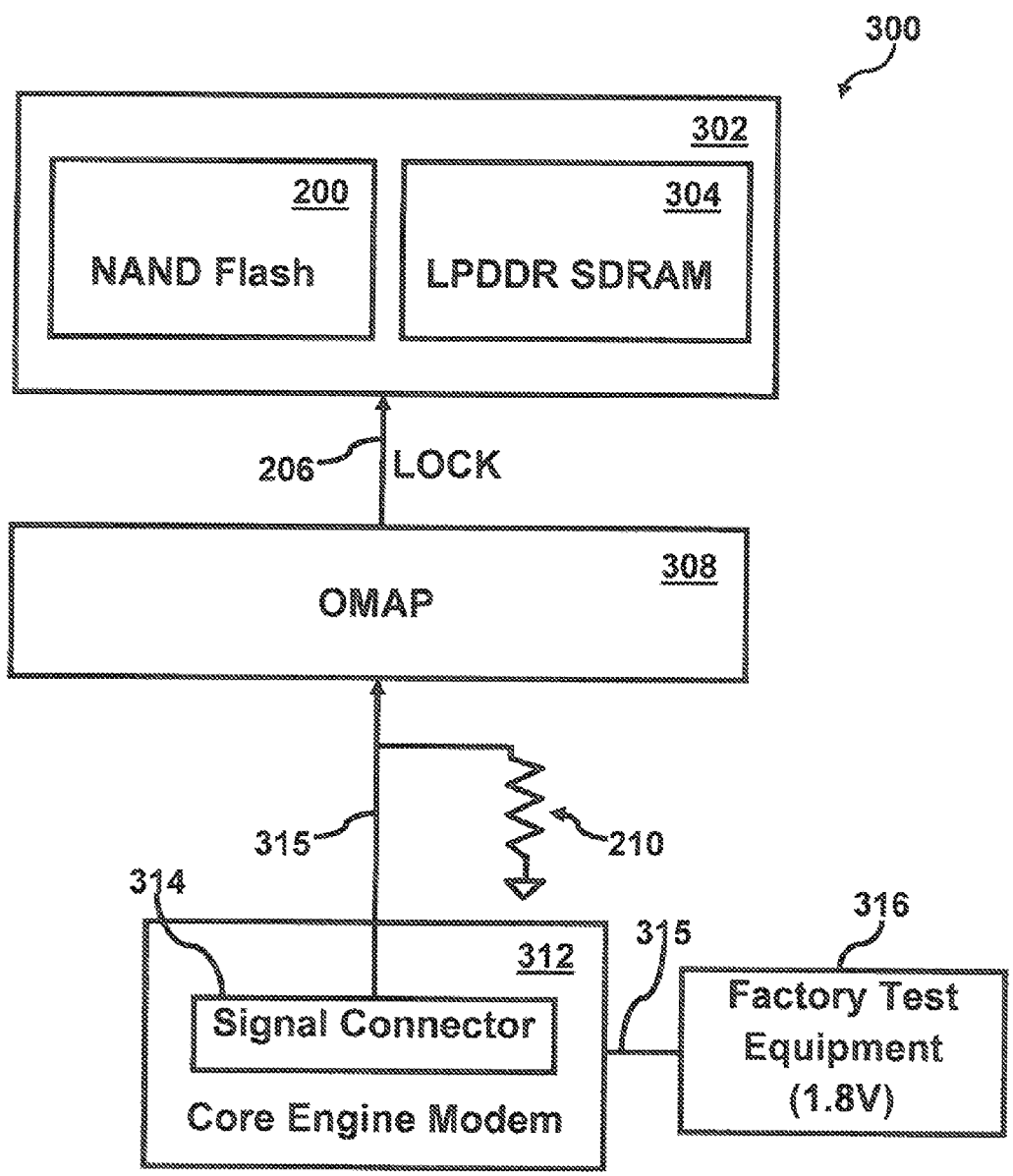
FIG. 4 illustrates a schematic diagram of an apparatus utilized for meeting GMR requirements in a radio system having a core engine modem installed in a factory test equipment, in accordance with the disclosed embodiments.
Figure 6:
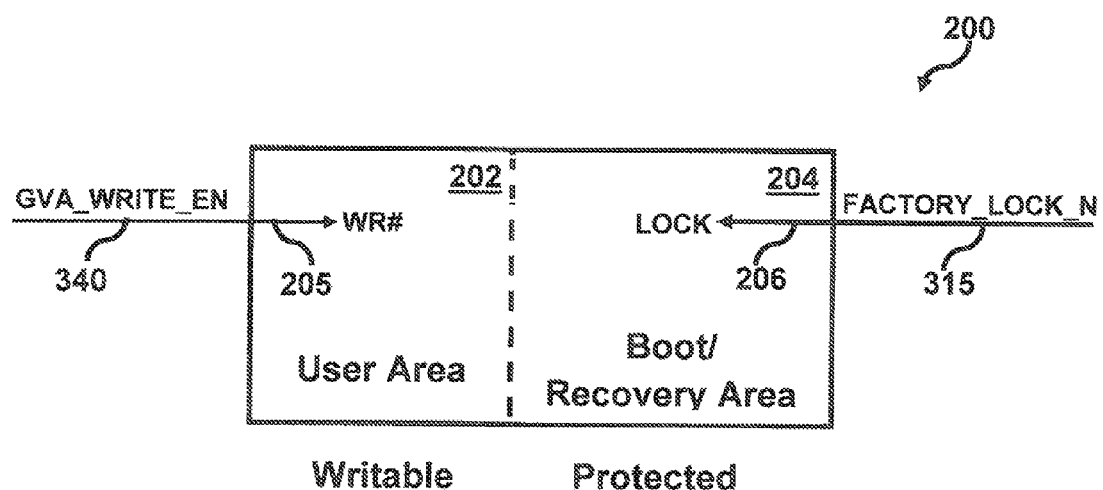
FIG. 6 illustrates a schematic diagram of the flash memory depicted in FIG. 2 showing write and lock signals, in accordance with the disclosed embodiments.

A simple overall schematic diagram of a core engine modem 312 showing the procedures depicted in FIGS. 3-5 for ensuring protection of required areas of flash while keeping the rest accessible is depicted in FIG. 6, in accordance with the disclosed embodiments. The FACTORY_LOCK_N signal 315 sets LOCK signal 206 to high, when core engine modem is installed in factory set equipment and this allows programming and locking of boot and recovery area of flash memory in factory. Then, the GVA_WRITE_EN signal 340 sets WP# signal 205 to high when the core engine modem 312 is installed in GVA and allows user area open for writing.

Note that the LOCK signal 206 represents the lock signal of PoP module 302, the WR# signal 205 represents the write protect signal of the PoP module 302, the FACTORY_LOCK_N signal 315 represents the lock signal from factory test equipment 316 and the GVA_WRITE_EN signal represents the write enable signal from the Ground Vehicle Adapter (GVA). Also note that the FACTORY_LOCK_N signal 315 sets the LOCK signal 206 of PoP module 302 and GVA_WRITE_EN signal sets the WR# signal 205 of the PoP module 302.

Figure 7:
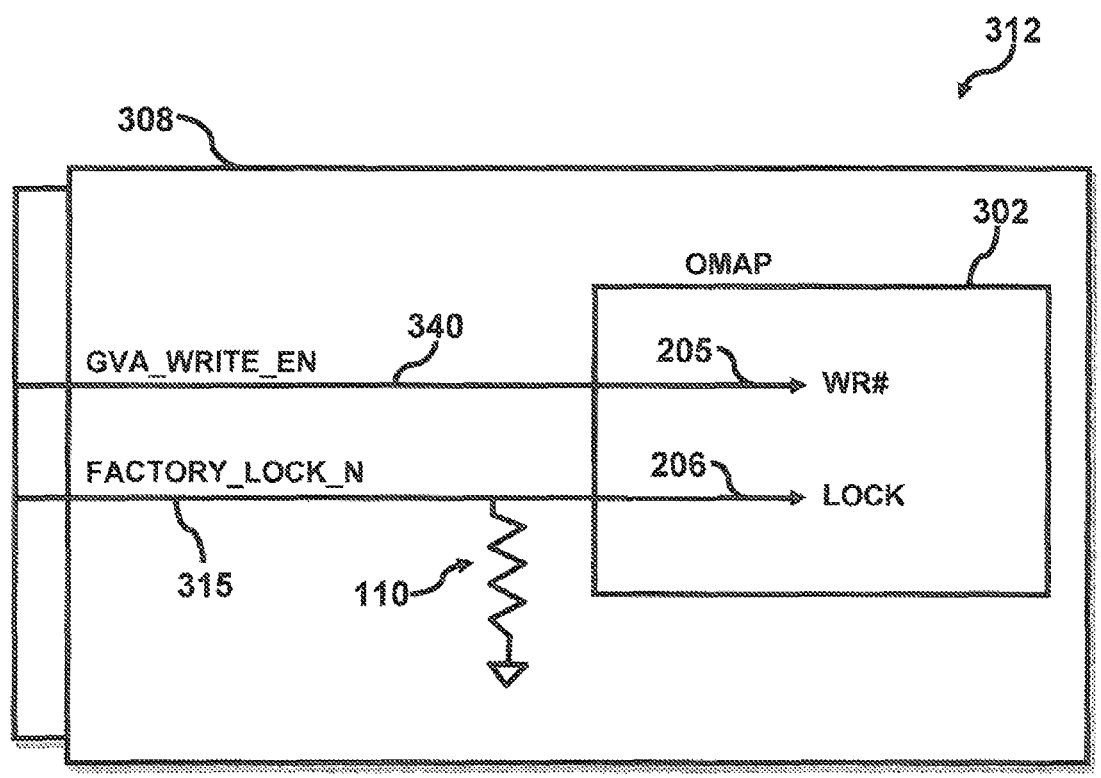
FIG. 7 illustrates a simple schematic diagram of an apparatus utilized for meeting GMR requirements in a radio system having a core engine modem showing write and lock signals, in accordance with the disclosed embodiments.
Figure 8:
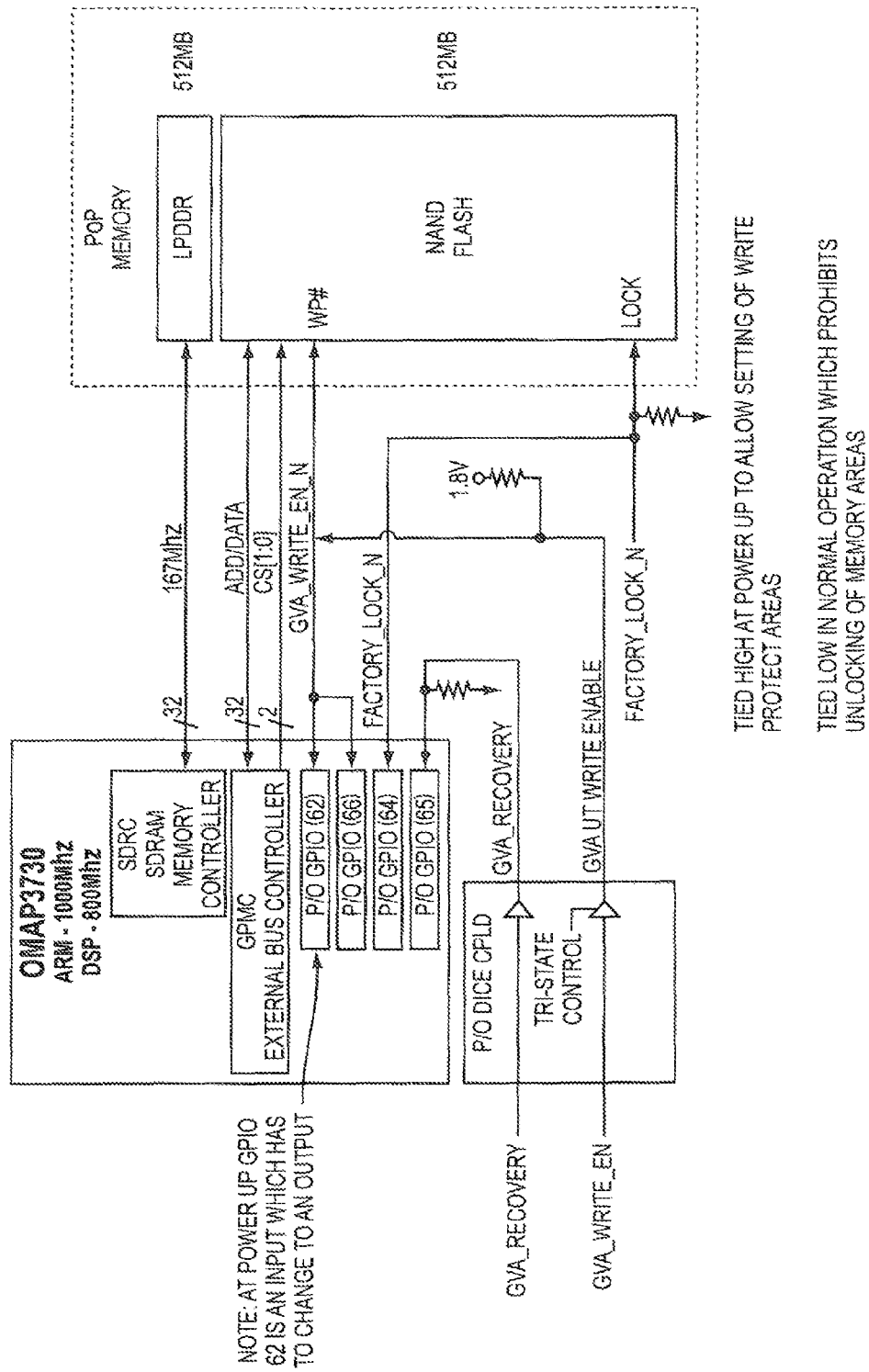
FIG. 8 illustrates a more complex schematic diagram of an alternate apparatus utilized for meeting GMR requirements.
Figure 9:
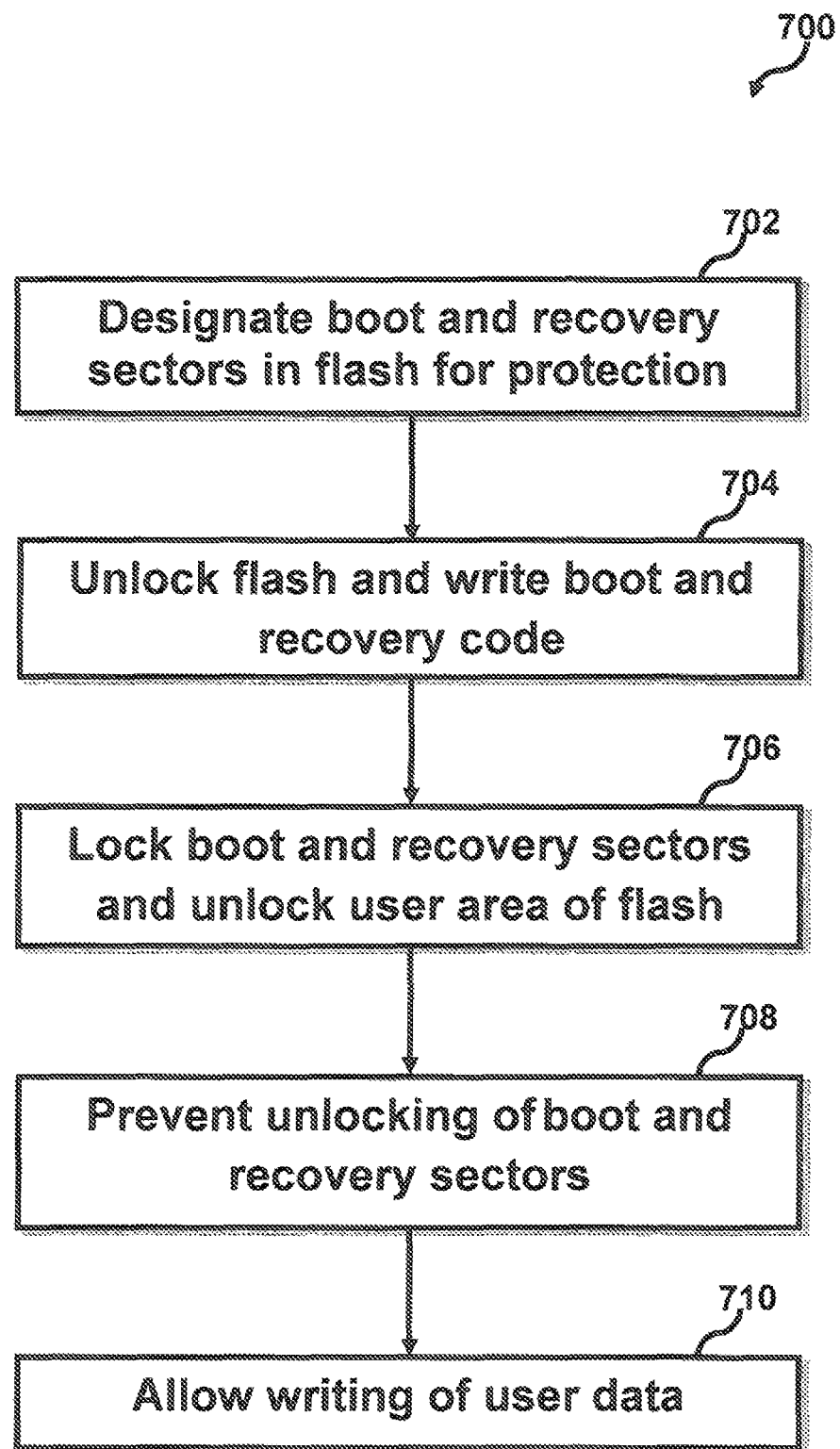
FIG. 9 illustrates a flow chart showing a method of protecting required areas of flash while keeping the rest accessible to meet Ground Mobile Radio (GMR) requirements in a radio system, in accordance with the disclosed embodiments.

Referring to FIG. 7, the problem of using Flash Boot and Recovery area protection to meet GRM requirement, may be addressed by changing the operating mode of the OMAP Write Protect Signal from an output to an input signal. In addition a buffer was added to the GMR Write Protect Signal which comes from the Crypto Sub-system. At power up the output of this buffer is in tri-state mode and is directly connected to the OMAP Write Protect signal. This guarantees that only one buffer is driving the Write Protect signal at a time so there is no electrical contention where two outputs are driving the same signal.

After power up the OMAP software code starts executing and it changes the operating mode of the OMAP Write Protect signal which is on GPIO62 from an output to an input. Once this is done software enables the Tri-State Control of the GMR Write Protect signal which drives the POP Memory Module Flash Write Protect signal directly.

FIG. 7 illustrates a flow chart showing a process 700 for protecting required areas of flash while keeping the rest accessible to meet Ground Mobile Radio (GMR) requirements in a radio system, in accordance with the disclosed embodiments. As said at block 702, the boot and recovery sectors in the flash are designate for protection. Then, the flash is unlocked for writing boot and recovery code in the designated sectors as illustrated at block 704. After writing boot and recovery code, as said at block 706, the designated sectors are locked and the user area is open for writing by unlocking the user area. Then unlocking of boot and recovery sectors is prevented as said at block 708. Finally, as depicted at block 710, user area is allowed for writing.

Note that programming and locking of boot and recovery area is performed by installing the core engine modem in factory set equipment. Then unlocking of boot and recovery area is prevented and user area is opened for writing by installing the core engine modem in GLS DICE-T. By performing the process 700, the required areas of flash are protected while keeping the rest accessible by user in order to meet Ground Mobile Radio (GMR) requirements in a radio system.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for meeting Ground Mobile Radio (GMR) requirements in a radio system comprising:
    designating a plurality of sectors in a flash memory for write protection wherein said flash memory is in a Package on Package (PoP) module of said radio system;
    unlocking said flash memory and programming said plurality of sectors;
    locking said plurality of sectors and preventing unlocking of said plurality of sectors of said flash memory; and
    allowing writing of user data in an area other that said plurality of sectors, wherein a lock signal on said Package-on-Package (PoP) module used in a DICE-T ensures protection said plurality of sectors of said flash memory while keeping rest accessible by user.

2. The method of claim 1 wherein said plurality of sectors comprises boot and recovery areas of said flash memory.

3. The method of claim 1 wherein programming and locking of said plurality of sectors are performed by utilizing a factory test equipment.

4. The method of claim 1 wherein programming said plurality of sectors comprises writing a boot and recovery code in said plurality of sectors.

5. The method of claim 1 wherein a write enable signal from a ground vehicle adapter of said radio system enable writing to said area of said flash memory by driving a write protect signal of said Package-on-Package (PoP) module.

6. The method of claim 1 wherein regardless of said write protect signal, boot and recovery areas remain protected due to locking of said plurality of sectors.

7. The method of claim 1 wherein said plurality of sectors of said flash memory is protected while keeping the remainder available for writing.

8. The method of claim 1 wherein said flash memory comprises a NAND flash memory.

9. The method of claim 1 wherein said Package on Package (PoP) module is a multi-chip module comprised of said NAND flash memory and a low power dual data rate synchronous dynamic access memory.

10. An apparatus for meeting Ground Mobile Radio (GMR) requirements in a radio system comprising:
    a Package on Package (PoP) module comprising a flash memory wherein a plurality of sectors in said flash memory are designated for write protection;
    a processing unit for programming and locking of said plurality of sectors;
    a factory test equipment for programming said plurality of sectors and locking said plurality of sectors:
    a dual integrated core engine transceiver for transmitting and receiving data, wherein said data is stored in said flash memory; and
    a ground vehicle adapter utilized for sending a write enable signal to said Package on Package module, wherein said signal allows user area of said flash memory open for writing.

11. The apparatus of claim 10 wherein said plurality of sectors comprises boot and recovery areas of said flash.

12. The apparatus of claim 10 wherein programming said comprises writing a boot and recovery code in said plurality of sectors.

13. The apparatus of claim 10 wherein a lock signal on said Package-on-Package (PoP) module used in said dual integrated core engine transceiver ensures protection of the required areas of said flash memory while keeping rest accessible.

14. The apparatus of claim 10 wherein said write enable signal enable writing to the user area of said flash memory by driving a write protect signal of said Package-on-Package (PoP) module.

15. The apparatus of claim 10 wherein regardless of said write protect signal, boot and recovery areas remain protected due to locking of said plurality of sectors.

16. The apparatus of claim 10 wherein said plurality of sectors of said flash memory is protected while keeping the remainder available for writing.

17. The apparatus of claim 10 wherein said flash memory comprises a NAND flash memory.

18. The apparatus of claim 10 wherein said Package on Package (PoP) module is a multi-chip module comprised of said NAND flash memory and a low power dual data rate synchronous dynamic access memory.

19. The apparatus of claim 10 wherein said processing unit comprises open multimedia application protocol processer.

20. A method for meeting Ground Mobile Radio (GMR) requirements in a radio system comprising:
    designating a plurality of sectors in a flash memory for write protection wherein said flash memory is in a Package on Package (PoP) module of said radio system;
    unlocking said flash memory and programming said plurality of sectors;
    locking said plurality of sectors and preventing unlocking of said plurality of sectors of said flash memory; and
    allowing writing of user data in an area other than said plurality of sectors, wherein a write enable signal from a ground vehicle adapter of said radio system enable writing to said area of said flash memory by driving a write protect signal of said Package-on-Package (PoP) module.

* * * * *